[12] United States Patent
Largey et al.

(10) Patent No.: US 8,224,268 B2
(45) Date of Patent: Jul. 17, 2012

(54) TRANSMITTER LINEARIZATION

(75) Inventors: Henry P. Largey, Wylie, TX (US);
Dallas L. Webster, Grand Prairie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 400 days.

(21) Appl. No.: 12/495,362

(22) Filed: Jun. 30, 2009

(65) Prior Publication Data
US 2010/0184392 A1  Jul. 22, 2010

Related U.S. Application Data

(60) Provisional application No. 61/146,141, filed on Jan. 21, 2009.

(51) Int. Cl.
*H04B 17/00* (2006.01)

(52) U.S. Cl. ... 455/115.2; 455/39; 455/63.1; 455/67.14; 455/73; 455/75; 455/114.2; 455/114.3; 455/126

(58) Field of Classification Search ............... 455/114.2, 455/114.3, 39, 63.1, 67.13, 67.14, 73–80, 455/126, 115.2; 375/296, 297; 330/149, 330/52
See application file for complete search history.

(56) References Cited

U.S. PATENT DOCUMENTS

| 5,262,734 | A | * | 11/1993 | Dent et al. | 330/52 |
| 6,246,865 | B1 | * | 6/2001 | Lee | 455/114.3 |
| 7,359,683 | B2 | | 4/2008 | Gilberton | |
| 7,386,286 | B2 | | 6/2008 | Petrovic et al. | |
| 7,570,923 | B2 | * | 8/2009 | Kiss et al. | 455/67.14 |
| 7,953,379 | B2 | * | 5/2011 | Poloni | 455/115.1 |
| 2005/0156662 | A1 | * | 7/2005 | Raghupathy et al. | 330/10 |
| 2009/0121788 | A1 | * | 5/2009 | Deisch | 330/149 |

OTHER PUBLICATIONS

"New methods for adaptation of quadrature modulators and demodulators in amplifier linearization circuits", Cavers, Aug. 1997, IEEE Transactions on vehicular technology, vol. 46 No. 3.*

\* cited by examiner

*Primary Examiner* — Nguyen Vo
*Assistant Examiner* — Stacey Sorawat
(74) *Attorney, Agent, or Firm* — Alan A. R. Cooper; Wade James Brady, III; Frederick J. Telecky, Jr.

(57) ABSTRACT

One aspect of the invention includes a communication system that includes a tone generator configured to generate a first tone, a second tone, and a third tone. The third tone can have a frequency that is a harmonic product of at least one of the frequencies of the first and second tones. A transmitter that includes a predistortion system transmits a test signal comprising the first, second, and third tones. A receiver that is communicatively coupled to the transmitter receives and processes a received test signal corresponding to the test signal. The system further includes a controller that generates a set of correction coefficients based on a measured interaction of the third tone with a non-linear signal component in the received test signal. The set of correction coefficients can be provided to the predistortion system for substantially linearizing communication signals transmitted from the transmitter.

20 Claims, 4 Drawing Sheets

TRANSMITTER LINEARIZATION

RELATED APPLICATION

This invention claims the benefit of U.S. Provisional Patent Application No. 61/146,141, which was filed on Jan. 21, 2009, and entitled AUTOMATED LINEARIZATION METHOD, the entire contents of which is incorporated herein by reference.

TECHNICAL FIELD

This invention relates to electronic circuits and, more specifically, to transmitter linearization.

BACKGROUND

The demand for wireless communication of voice and data is constantly increasing. Some wireless communication devices can include a transceiver that implements a direct upconversion and downconversion system. Direct upconversion is a system in which an information-carrying baseband signal is mixed directly with a high-frequency local oscillator (LO) carrier signal in a transmitter. The combined radio frequency (RF) signal is amplified and transmitted from the wireless communication device. Likewise, direct downconversion describes a system in which a received RF signal is downconverted by using an LO to remove the carrier signal from the received RF signal in a receiver to obtain the information carrying baseband signal. In either case, the baseband signal can be split into both in-phase (I) and quadrature-phase (Q) components.

Non-linear devices in the transmitter, such as certain types of power amplifiers, can generate unwanted harmonics or intermodulation products in the transmitted signal. Such unwanted harmonics or intermodulation products can, in turn, result in interference with the transmitted signal and/or distortion of the signal at the receiver to which the signal is transmitted. The transmitted signal can be conditioned within the transmitter to compensate for the non-linear devices. As an example, devices have been developed that can implement error vector magnitude (EVM) analysis of the transmit signal. However, such devices can be expensive, and such analysis can be very time consuming.

SUMMARY

One aspect of the invention includes a communication system that includes a tone generator configured to generate a first tone, a second tone, and a third tone. The third tone can have a frequency that is a harmonic product of at least one of the frequencies of the first and second tones. A transmitter that includes a predistortion system transmits a test signal comprising the first, second, and third tones. A receiver that is communicatively coupled to the transmitter receives and processes a received test signal corresponding to the test signal. The system further includes a controller that generates a set of correction coefficients based on a measured interaction of the third tone with a non-linear signal component in the received test signal. The set of correction coefficients can be provided to the predistortion system for substantially linearizing communication signals transmitted from the transmitter.

Another embodiment of the invention includes a method for substantially linearizing a transmitter of a communication system. The method includes generating a first tone, a second tone, and a third tone. The third tone can have a frequency that is a harmonic product of at least one of the frequencies of the first tone and the second tone. The method also includes providing a transmit test signal that comprises the first, second, and third tones via the transmitter and receiving a received test signal corresponding to the test signal on a receiver that is communicatively coupled to the transmitter. The received test signal can include non-linear signal components introduced by the transmitter. The method also includes rotating a phase of the third tone relative to the first and second tones through a set of phases. The method also includes measuring an interaction of the third tone with a non-linear signal component in the received test signal for each phase of the third tone in the range of phases and generating a set of correction coefficients based on the measured interaction through the range of phases of the third tone relative to the first and second tones. The method further includes providing the set of correction coefficients to a predistortion system for substantially linearizing communication signals transmitted from the transmitter.

Another embodiment of the invention includes a communication system. The system includes a predistortion system configured to predistort communication signals that are transmitted from a transmitter for substantially linearizing the communication signals based on a set of correction coefficients for each of a plurality of harmonics of the communication signals. The system also includes a tone generator configured to provide a respective plurality of test signals to the transmitter, each of the respective plurality of test signals comprising a first tone having a first frequency, a second tone having a second frequency, and a third tone having a frequency that is a harmonic products of at least one of the frequencies of the first tone and the second tone corresponding a respective one of the plurality of harmonics of the communication signals. The system also includes an estimator configured to process each of a plurality of received test signals in a receiver that is communicatively coupled to the transmitter. Each of the plurality of received test signals can correspond to a respective one of the plurality of test signals. The system further includes a controller configured to generate the set of correction coefficients for each of the plurality of harmonics of the communication signals based on the plurality of received test signals.

DETAILED DESCRIPTION

The invention relates to electronic circuits and, more specifically, to transmitter linearization. A communication system having a transmitter and a receiver can include a tone generator that can generate three or more tones. The first and second tones, which are "fundamental" tones, can have respective first and second frequencies. Third tone, which is a "product" tone, can have a frequency that is a harmonic product of at least one of the first and second tones. It is to be understood, however, that the tone generator can generate any number of fundamental and/or product tones. In addition, as described herein, the term "harmonic product" can describe a harmonic of one of first and second tones, and can also describe an intermodulation of the first and second tones.

The tone generator can provide a test signal that includes the three tones to the transmitter of the communication system. The transmitter can be communicatively coupled to the receiver, such as through an external wireless connection or through an internal leakage path. The transmitted test signal can thus be received and processed at the receiver, such as via a direct correlator (DC) estimator that can implement a fast Fourier transform (FFT), to ascertain amplitude components of a non-linear signal component (e.g., a harmonic and/or intermodulation signal component).

A controller can generate a set of receive data based on the phase and amplitude components of the non-linear signal component. As an example, the set of receive data can be indicative of an interaction of the third tone at a specific phase relative to the first and second tones with the non-linear signal component. Thus, the controller can command a phase adjuster to rotate the phase of the third tone relative to the first and second tones across a set of phases to generate the set of receive data. The controller can thus generate a set of correction coefficients based on the set of receive data. The set of correction coefficients can include phase and amplitude correction coefficients for harmonics of the communication signals transmitted from the transmitter. As an example, the transmitter can include a polyharmonic predistortion system that implements separate sets of correction coefficients for each of a plurality of harmonics (e.g., $2^{nd}$, $3^{rd}$, $4^{th}$, etc.) to substantially linearize communication signals that are transmitted from the transmitter.

Figure 1:
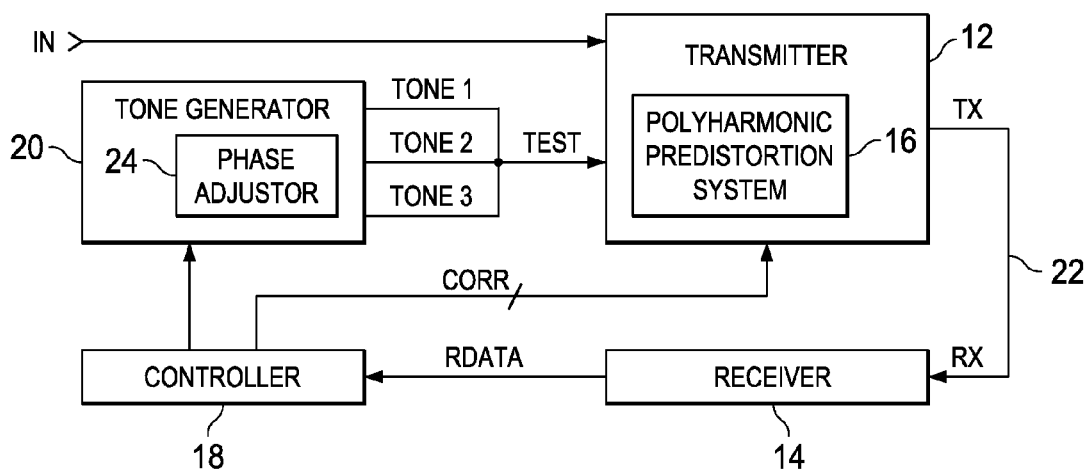
FIG. 1 illustrates an example of a communication system in accordance with an aspect of the invention.

FIG. 1 illustrates an example of a communication system 10 in accordance with an aspect of the invention. The communication system 10 can be implemented in any of a variety of wireless communication devices, such as a portable telephone or a wireless modem. In the example of FIG. 1, the communication system 10 includes a transmitter 12 and a receiver 14. The transmitter 12 is configured to amplify and transmit communication signals, such as wirelessly, and the receiver 14 is configured to receive and process incoming communication signals. In the example of FIG. 1, the communication signals are demonstrated by the signal IN. As an example, the transmitter 12 and the receiver 14 can be included in an integrated circuit (IC).

The transmitter 12 can include one or more components (not shown in the example of FIG. 1) that are non-linear. As an example, certain classes of power amplifiers, such as Class B or Class AB power amplifiers, may compromise linearity for efficiency. The non-linear components of the transmitter 12 can thus result in unwanted non-linear signal components (e.g., harmonic and/or intermodulation signal components) that can result in distortion of the communication signals IN that are transmitted from the transmitter 12. To compensate for the non-linear signal components of the communication signals IN, the transmitter 12 includes a polyharmonic predistortion system 16. The polyharmonic predistortion system 16 is configured to introduce distortion into the communication signals IN that are transmitted from the transmitter 12. Specifically, the polyharmonic predistortion system 16 provides phase and/or gain correction to one or more of a plurality of harmonics of the communication signals IN to compensate for the non-linearity of the transmitter 12, thus effectively providing linearization of the communication signals IN.

To provide the proper phase and gain correction to the harmonics of the communication signals IN, the communication system 10 includes a controller 18 that is configured to generate correction coefficients CORR. The correction coefficients CORR are provided to the polyharmonic predistortion system 16. As an example, the correction coefficients CORR can include sets of phase and gain correction coefficients for each of a plurality of harmonics of the communication signals IN that are transmitted from the transmitter 12. The sets of phase and gain correction coefficients therefore provide the corresponding phase and gain correction to each harmonic of the communication signals IN for providing linearization of the communication signals IN.

To generate the correction coefficients CORR, the controller 18 activates a tone generator 20, such as during a calibration or validation procedure (e.g., during manufacture of the communication system 10). The tone generator 20 is configured to generate a test signal TEST that includes three or more tones. In the example of FIG. 1, the first, second, and third tones are demonstrated respectively as TONE 1, TONE 2, and TONE 3 that are combined to generate the test signal TEST. TONE 1, TONE 2, and TONE 3 can each have a distinct frequency. As an example, TONE 1 and TONE 2 are fundamental tones having separate and arbitrary frequencies that may or may not be coherent. TONE 3, however, is a product tone that can have a frequency that is selected as a harmonic product of at least one of TONE 1 and TONE 2.

The test signal TEST is provided to the transmitter 12. Thus, the test signal TEST is subjected to the non-linearity of the transmitter 12, resulting in a plurality of non-linear signal components. The test signal TEST is transmitted from the transmitter 12 as a transmit signal TX that includes the test signal TEST and the plurality of non-linear signal components. In the example of FIG. 1, the transmitter 12 is communicatively coupled to the receiver 14, indicated by a signal path 22. As an example, the signal path 22 can be a wireless coupling that is external to the IC in which the transmitter 12 and receiver 14 are included. As another example, the signal path 22 can be an internal loopback path, such as a leakage path. Thus, the transmit signal TX is received and processed at the receiver 14 as a received test signal RX.

The receiver 14 can be configured to generate receive data RDATA that corresponds to the received test signal RX. As an example, the receive data RDATA can include information characterizing an interaction between TONE 3 and one or more of the non-linear signal components. The receive data RDATA is provided to the controller 18 that can thus generate the correction coefficients CORR based on the receive data RDATA.

In the example of FIG. 1, the tone generator 20 includes a phase adjuster 24 that is configured to rotate the phase of TONE 3 relative to TONE 1 and TONE 2 in response to commands from the controller 18. As an example, the phase of TONE 3 can be rotated while the phases of TONE 1 and TONE 2 remain stationary, or the phases of TONE 1 and TONE 2 can be rotated by the same angle while the phase of TONE 3 remains stationary. Therefore, the receive data RDATA can correspond to the interaction of TONE 3 with the non-linear signal component of the received test signal RX at each of a set of phases of the rotated phase of TONE 3. For example, because TONE 3 has a frequency that is selected as a harmonic product of at least one of TONE 1 and TONE 2, TONE 3 can have an approximately equal frequency with respect to the non-linear signal component. Accordingly, TONE 3 and the non-linear signal component can be combined with respect to amplitude.

By rotating the phase of TONE 3 relative to TONE 1 and TONE 2 via the phase adjuster 24, the controller 18 can determine the non-linearity of the transmitter 12 with respect to phase and amplitude. Specifically, respective phases of TONE 3 at which a maximum peak and a minimum trough occur with respect to an amplitude of the received test signal RX at the frequency of TONE 3 correspond to substantial phase alignment of TONE 3 with the non-linear signal component. Therefore, those respective phases can be identified by the controller 18 to indicate the phase non-linearity of the transmitter 12 with respect to a given harmonic of the communication signals IN. In addition, an amplitude difference between the determined maximum peak and trough can correspond to gain non-linearity of the transmitter 12 of the given harmonic. Accordingly, the controller 18 can generate the appropriate correction coefficients CORR and program the polyharmonic predistortion system 16 to compensate for the non-linearity of the transmitter 12 for a given harmonic, or can report the characterized non-linearities of the performance of the transmitter 12.

Upon generating the correction coefficients CORR for a given harmonic of the communication signals IN that are to be transmitted from the transmitter 12, the controller 18 can set the frequency of TONE 3 to a different frequency corresponding to a next harmonic and repeat the process. For example, the controller 18 can generate a first set of correction coefficients CORR that correspond to a first harmonic (i.e., $2^{nd}$-order harmonic) by setting the frequency of TONE 3 to be a second-order product of at least one of TONE 1 and TONE 2 and rotating the phase via the phase adjuster 24, as described above. The controller 18 can then generate a second set of correction coefficients CORR that correspond to a second harmonic (i.e., $3^{rd}$-order harmonic) by setting the frequency of TONE 3 to be a third-order product of at least one of TONE 1 and TONE 2 and rotating the phase via the phase adjuster 24, as described above. The controller 18 can thus generate a plurality of sets of correction coefficients that correspond, respectively, to each of a plurality of harmonics of the communication signals IN to be transmitted from the transmitter 12. The polyharmonic predistortion system 16 can thus employ the correction coefficients CORR to substantially linearize the communication signals IN.

The manner in which the correction coefficients CORR are generated in the communication system 10 can be a much more efficient manner than in typical communication systems. Typical systems for correcting distortion cannot accurately obtain phase information with respect to the distortion caused by non-linear devices. In addition, the communication system 10 can be implemented to generate the correction coefficients CORR in a much less time consuming manner and can use significantly less memory than typical systems. Furthermore, the communication system 10 can be implemented to measure amplitude information for harmonic signal components that have a power level that is approximately the same as the noise floor of the communication signals IN, and can thus generate the correction coefficients CORR more accurately than typical systems.

It is to be understood that the communication system 10 is not intended to be limited to the example of FIG. 1. As an example, the tone generator 20 can be implemented as an external component that operates independently of the controller 18. In addition, the controller 18 can be configured external to the communication system 10. As an example, the controller 18 can be configured as any of a variety of signal analyzers. Furthermore, it is to be understood that the non-linearity of the transmitter 12 can result from external components, such as an external power amplifier (not shown), and/or multiple power amplifiers. Therefore, the communication system 10 can be configured in any of a variety of ways based on the description herein.

Figure 2:
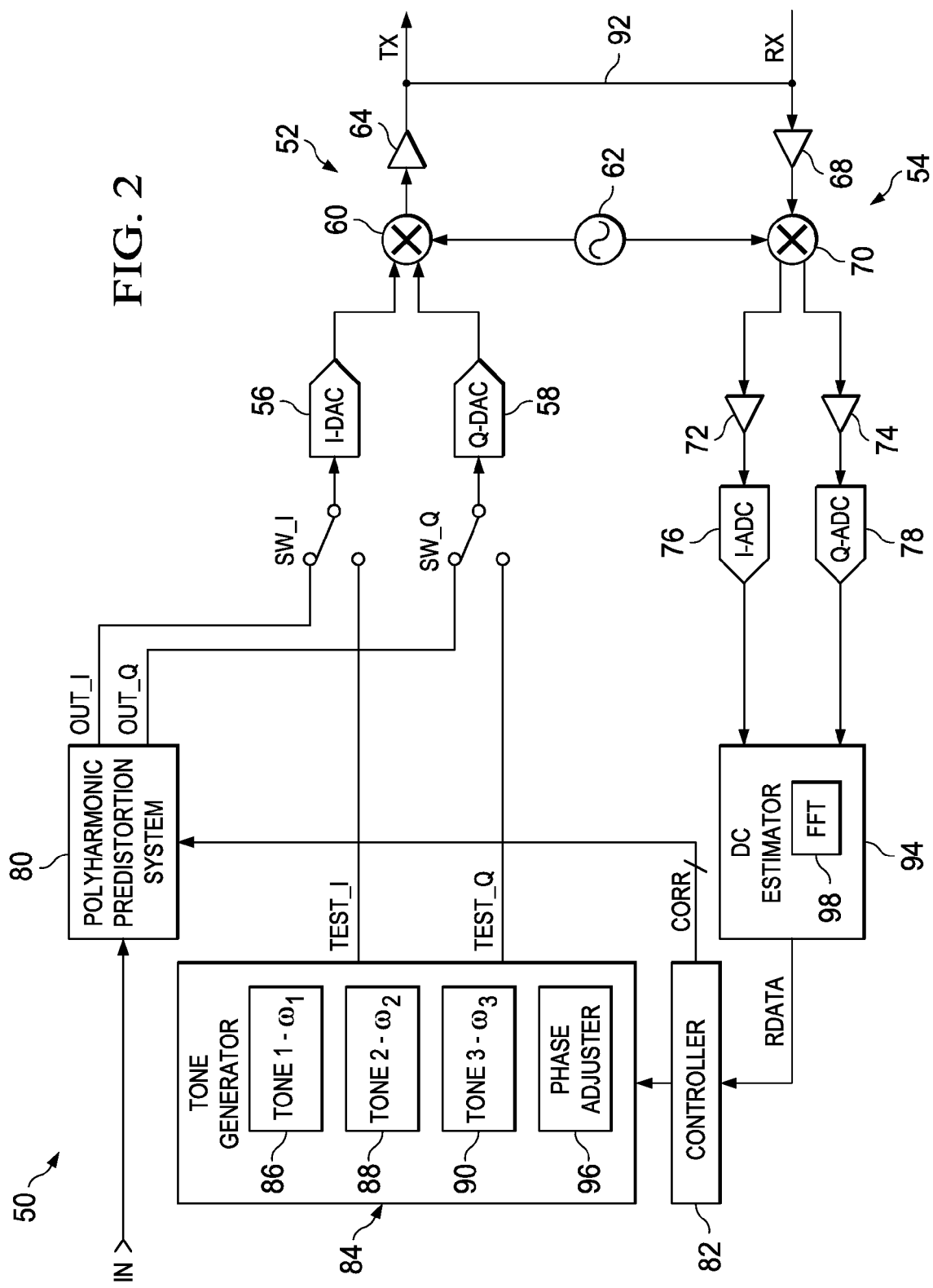
FIG. 2 illustrates another example of a communication system in accordance with an aspect of the invention.

FIG. 2 illustrates another example of a communication system 50 in accordance with an aspect of the invention. Similar to the communication system 10, the communication system 50 can be implemented in any of a variety of wireless communication devices, such as a cellular telephone or a wireless modem. In the example of FIG. 2, the communication system 50 includes a transmitter 52 and a receiver 54. Similar to as described above in the example of FIG. 1, the transmitter 52 is configured to amplify and transmit communication signals, such as wirelessly. The receiver 54 is configured to receive and process incoming communication signals. As an example, the transmitter 52 and the receiver 54 can be included in an integrated circuit (IC).

In the example of FIG. 2, the transmitter 52 and receiver 54 are configured to implement orthogonal frequency division multiplexing (OFDM) with respect to the communication signals IN that are respectively transmitted and received. Thus, the communication system 50 can be configured to operate on any of a variety of OFDM or other communication standards. As an example, the communication system 50 can operate on standards such as, but not limited to, IEEE802.11a, IEEE802.11b, IEEE802.11g, IEEE802.11n, IEEE802.16, WIBREE, GSM EDGE, and LTE.

Communication signals that are to be transmitted from the transmitter 52 are separated into respective in-phase (I) and quadrature-phase (Q) components. The transmitter 52 includes a digital-to-analog converter (DAC) for each of the I and Q signal components, demonstrated in the example of FIG. 2 as I-DAC 56 and Q-DAC 58. Analog I and Q signal components are upconverted by a mixer 60 based on a local oscillator (LO) signal that is generated by an LO 62. The mixed signal is then amplified at a power amplifier 64 and is transmitted from the transmitter 52. Similarly, signals that are received at the receiver 54, such as wirelessly, are amplified at an amplifier 68, which can include at least one of a low noise amplifier (LNA) or transconductance amplifier (TA). The amplified signal is then downcoverted by a mixer 70 based on the LO signal from the LO 62 and separated into respective I and Q components. The resulting I and Q signal components are then amplified by respective amplifiers 72 and 74, which can be, for example, variable gain amplifiers. The I and Q signal components are then provided to respective analog-to-digital converters (ADCs), demonstrated in the example of FIG. 2 as I-ADC 76 and Q-ADC 78, respectively, to generate resultant digital signals.

In the example of FIG. 2, the power amplifier 64 can be a non-linear amplifier. Therefore, the amplification of the communication signals that are transmitted from the transmitter 52 can include unwanted non-linear signal components that can result in distortion of the communication signals. To compensate for the harmonic signal components of the communication signals, the transmitter 52 includes a polyharmonic predistortion system 80. The polyharmonic predistortion system 80 is configured to introduce corrective distortion into the communication signals IN that are transmitted from the transmitter 52, similar to as described above in the example of FIG. 1, to provide linearization of the communication signals IN. Therefore, in the example of FIG. 2, the communication signals IN are output from the polyharmonic predistortion system 80 as output signals OUT_I and OUT_Q that have been predistorted with corrective distortion to substantially linearize the communication signals IN.

To control phase and gain correction for the non-linearities of the transmitted communication signals, the communication system 50 includes a controller 82 that is configured to generate correction coefficients CORR which are implemented to predistort the transmitted signal. The controller 82 provides the correction coefficients CORR to the polyharmonic predistortion system 80. As an example, the correction coefficients CORR can include one or more sets of phase and gain correction coefficients for each of a plurality of harmonics of the communication signals that are transmitted from the transmitter 52. The sets of phase and gain correction coefficients therefore provide the corresponding phase and gain correction for harmonic and intermodulation distortion of the communication signals for providing linearization of the communication signals.

The controller 82 activates a tone generator 84, such as during a calibration or validation procedure during manufacture of the communication system 50. The tone generator 84 is configured to generate a test signal, demonstrated in the example of FIG. 2 as TEST_I and TEST_Q, that includes a first tone 86, a second tone 88, and a third tone 90. In the example of FIG. 2, the first tone 86 has a frequency $\omega_1$, the second tone 88 has a frequency $\omega_2$, and the third tone 90 has a frequency $\omega_3$. As an example, the frequencies $\omega_1$ and $\omega_2$ can be separate and arbitrary frequencies that may or may not be coherent. The frequency $\omega_3$, however, can be selected as a harmonic product of at least one of the frequencies $\omega_1$ and $\omega_2$. As an example, for generating the correction coefficients CORR for the first harmonic (i.e., $2^{nd}$-order harmonic) of the communication signals, the frequency $\omega_3$ can be any of $2*\omega_1$, $2*\omega_2$, and $\omega_1+\omega_2$. Similarly, for generating the correction coefficients CORR for the second harmonic (i.e., $3^{rd}$-order harmonic) of the communication signals, the frequency $\omega_3$ can be any of $2*\omega_1-\omega_2$, $2*\omega_1+\omega_2$, $2*\omega_2-\omega_1$, $2*\omega_2+\omega_1 3*\omega_1$, and $3*\omega_2$, and so forth for higher-order harmonics of the communication signals. It is to be understood, however, that some of the harmonic products may have a frequency that is beyond the bandwidth of the receiver 54, thus possibly limiting the available choices of the frequency $\omega_3$ of the third tone 90.

The test signal TEST_I and TEST_Q, which is a combination of the three tones 86, 88, and 90, is provided to the transmitter 52 via a set of switches SW_I and SW_Q, respectively. Thus, the test signal TEST_I and TEST_Q is subjected to the non-linearity of the transmitter 52, such as from the power amplifier 64, resulting in a plurality of non-linear harmonic and/or intermodulation signal components. The test signal TEST_I and TEST_Q is transmitted from the transmitter 52 as a transmit signal TX that includes the test signal TEST_I and TEST_Q and the plurality of non-linear signal components. In the example of FIG. 2, the transmitter 52 is communicatively coupled to the receiver 54, indicated by a signal path 92. As an example, the signal path 92 can be a wireless coupling that is external to the IC that includes the transmitter 52 and receiver 54. As another example, the signal path 92 can be an internal loopback path, such as a leakage or other return path. Thus, the transmit signal TX is received and processed at the receiver 54 as a received test signal RX.

As described above, the received test signal RX is amplified, downconverted, and separated into the digital I and Q components by the I-ADC 76 and Q-ADC 78, the digital I and Q components are provided to a DC estimator 94. The DC-estimator 94 can be configured to implement a fast Fourier transform (FFT) 98 on the digital received test signal RX to convert the received test signal RX to a frequency domain representation. The non-linear signal components can be extracted from the discrete Fourier transform of the digital received test signal RX for each sampled phase of the third tone 90. The DC estimator 94 thus generates receive data RDATA that corresponds to the received test signal RX. As an example, the receive data RDATA can include information regarding an interaction between the third tone 90 and one of the plurality of non-linear signal components. Specifically, the information can include a power summation of the third tone 90 and the respective one of the non-linear signal components. The receive data RDATA is provided to the controller 82 that can thus generate the correction coefficients CORR based on the receive data RDATA.

In the example of FIG. 2, the tone generator 84 includes a phase adjuster 96 that is configured to rotate the phase of the third tone 90 relative to the first and second tones 86 and 88 in response to commands from the controller 82. As an example, the phase of the third tone 90 can be rotated while the phases of the first and second tones 86 and 88 remain stationary, or the phases of the first and second tones 86 and 88 can be rotated by the same angle while the phase of the third tone 90 remains stationary. Therefore, the receive data RDATA can correspond to the interaction of the third tone 90 with the non-linear signal component of the received test signal RX at each of a set of phases through which the third tone 90 is rotated. Specifically, because the frequency co, of the third tone 90 is selected as a harmonic product of at least one of the first and second tones 86 and 88, the third tone 90 can have an approximately equal frequency with respect to the respective non-linear signal component. Accordingly, the third tone 90 and the non-linear signal component can be combined with respect to amplitude. Thus, as described above, the receive data RDATA represents a power summation of the third tone 90 and the non-linear signal component.

By rotating the phase of the third tone 90 relative to the first and second tones 86 and 88 via the phase adjuster 96, the controller 84 can determine the non-linearity of the transmitter 52 with respect to phase and amplitude. For example, respective phases of the third tone 90 at which a maximum peak and a minimum trough occur at the frequency of the third tone 90 with respect to an amplitude of the received test signal RX correspond to phase alignment of the third tone 90 with the non-linear signal component. Therefore, those respective phases are indicative of the phase non-linearity of the transmitter 52. In addition, an amplitude difference between the determined peak and trough can correspond to gain non-linearity of the transmitter 52. Accordingly, the controller 84 can generate the appropriate correction coefficients CORR and program the polyharmonic predistortion system 80 to compensate for the non-linearity of the transmitter 52.

Figure 3:
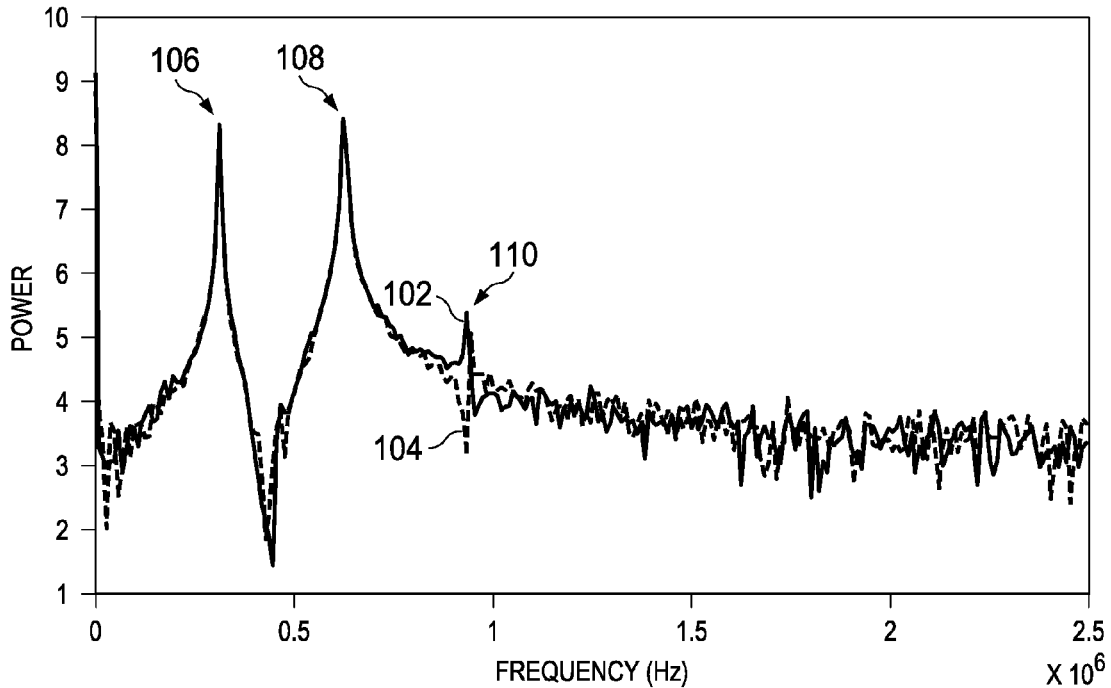
FIG. 3 illustrates an example of a graph of power versus frequency of a pair of received signals in accordance with an aspect of the invention.

FIG. 3 illustrates an example of a graph 100 of power versus frequency of a pair of received signals 102 and 104 in accordance with an aspect of the invention. The graph 100 can be representative of an output from any of a variety of signal analyzers. The signals 102 and 104 can each be representative of the received signal RX in the example of FIG. 2. Therefore, the signals 102 and 104 each include the first and second tones 86 and 88, as well as the third tone 90 and non-linear signal components that are generated from the non-linear circuit components of the transmitter 52, such as the power amplifier 64. Accordingly, reference is to be made to the example of FIG. 2 in the following description of the example of FIG. 3.

In the example of FIG. 3, the graph 100 demonstrates that a first tone has a frequency $\omega_1$ of approximately 333 kHz, indicated at 106, a second tone has a frequency $\omega_2$ of approximately 625 kHz, indicated at 108, and a third tone has a frequency of $\omega_3$ of approximately 958 kHz, indicated at 110. The signals 102 and 104 are demonstrated as substantially similar in the example of FIG. 3, with the exception of the amplitude at the frequency $\omega_3$.

In the example of FIG. 3, each of the signals 102 and 104 include a phase-shift of the third tone 110 with respect to the first and second tones 106 and 108. As an example, in the signal 102, the third tone 110 can have a phase shift of approximately 90° relative to the first and second tones 106 and 108, and in the signal 104, the third tone 110 can have a phase shift of approximately 270° relative to the first and second tones 106 and 108. Thus, the signals 102 and 104 each demonstrate power summation of the third tone 110 with a non-linear intermodulation product signal component at approximately the same frequency $\omega_3$. Specifically, the signal 102 demonstrates a peak above the noise floor at the frequency $\omega_3$, such that the third tone 110 and the non-linear intermodulation product signal component are positively added, and the signal 104 demonstrates a trough below the noise floor at the frequency $\omega_3$, such that the third tone 110 and the non-linear intermodulation product signal component are subtracted.

Therefore, the rotation of the phase of the third tone 110 relative to the phases of the first and second tones 106 and 108 can result in the peak and the trough of the respective signals 102 and 104 above and below the noise floor of the signals 102 and 104. The phases of the third tone 110 in each of the signals 102 and 104 can be representative of non-linearity of the transmitter 52 with respect to phase, and can thus correspond to phases for which phase correction coefficients can be generated. In addition, a difference in amplitude between the peak and the trough of the signals 102 and 104 can be calculated (e.g., by the controller 82 of the example of FIG. 2) that can likewise be representative of non-linearity of the transmitter 52 with respect to gain, and can thus correspond to an amplitude for which gain correction coefficients can be generated. Accordingly, the controller 82 can generate the correction coefficients CORR based on the phase and amplitude information of the signals 102 and 104 for a given harmonic of the communication signals.

Referring back to the example of FIG. 2, upon generating the correction coefficients CORR for a given harmonic of the communication signals that are to be transmitted from the transmitter 52, the controller 82 can set the frequency of the third tone 90 to a different frequency corresponding to a next harmonic and repeat the process. For example, the controller 82 can generate a first set of correction coefficients CORR that correspond to a first harmonic (i.e., $2^{nd}$-order harmonic) by setting the frequency of the third tone 90 to be a second-order product of at least one of the first and second tones 86 and 88 and rotating the phase via the phase adjuster 96, as described above. The controller 82 can then generate a second set of correction coefficients CORR that correspond to a second harmonic (i.e., $3^{rd}$-order harmonic) by setting the frequency of the third tone 90 to be a third-order product of at least one of the first and second tones 86 and 88 and rotating the phase via the phase adjuster 92, as described above. The controller 82 can thus generate a plurality of sets of correction coefficients that correspond, respectively, to each of a plurality of harmonics or intermodulation products of the communication signals to be transmitted from the transmitter 52. The polyharmonic predistortion system 80 can thus substantially linearize the communication signals based on the correction coefficients CORR determined for each of the plurality of harmonics.

Figure 4:
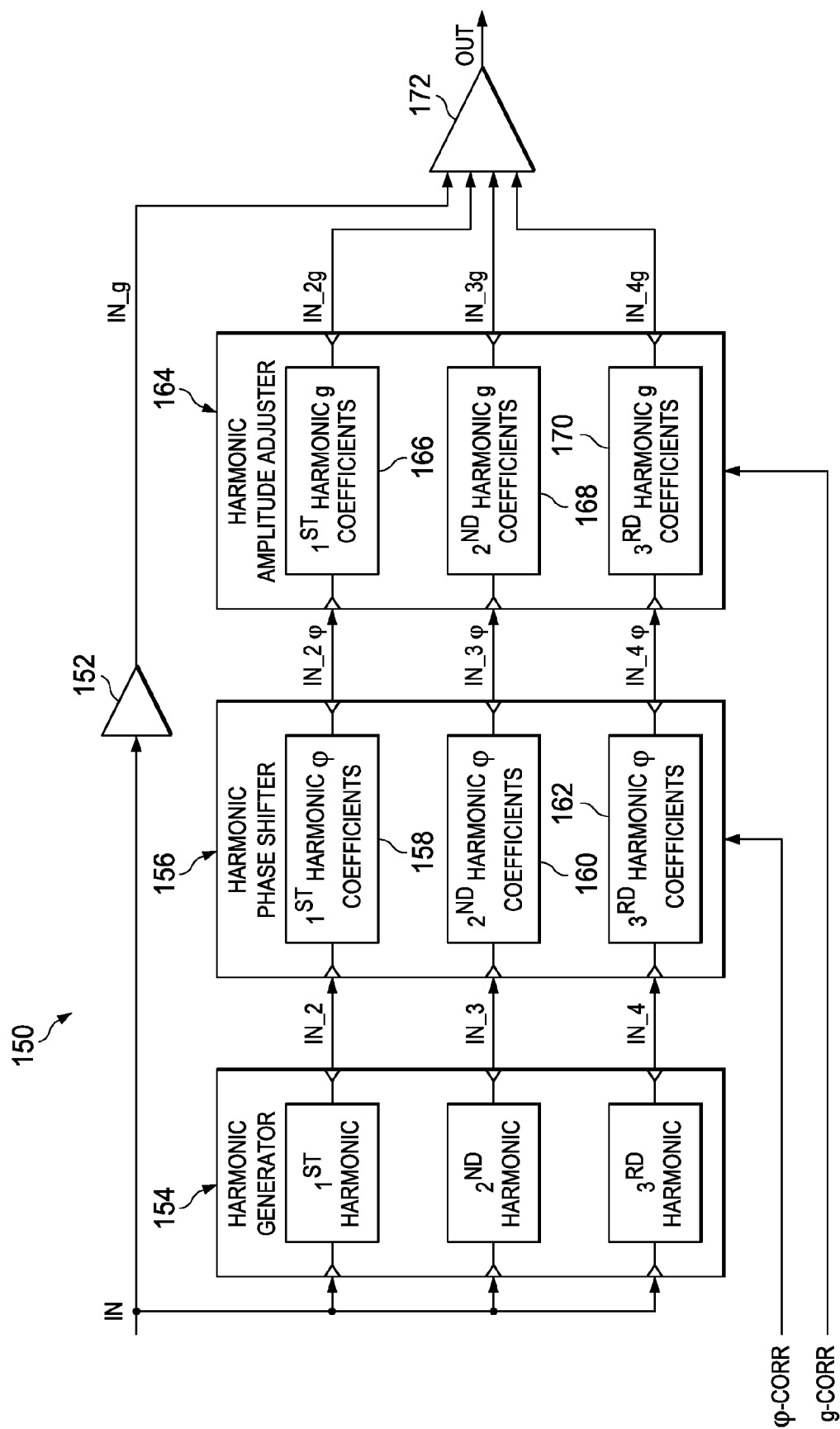
FIG. 4 illustrates an example of a polyharmonic predistortion system in accordance with an aspect of the invention.

FIG. 4 illustrates an example of a polyharmonic predistortion system 150 in accordance with an aspect of the invention. The polyharmonic predistortion system 150 can be implemented in the communication system 50 in the example of FIG. 2, such as corresponding to the polyharmonic predistortion system 80. Therefore, reference may be made to the example of FIG. 2 for additional context of the description of the example of FIG. 4.

In the example of FIG. 4, the polyharmonic predistortion system 150 receives an input signal IN, which can be representative of communication signals that are to be transmitted from the transmitter 52. The input signal IN is provided to an amplifier 152 that provides a predetermined amount of gain to the input signal IN to generate an amplified input signal IN_g. The input signal IN is also provided to a harmonic generator 154 that is configured to generate a plurality of separate-order harmonics of the input signal IN. In the example of FIG. 4, the harmonic generator 154 is configured to generate a $2^{nd}$-order harmonic, a $3^{rd}$-order harmonic, and a $4^{th}$-order harmonic of the input signal IN. The harmonic generator 154 thus generates a $2^{nd}$-order harmonic signal IN_2, a $3^{rd}$-order harmonic signal IN_3, and a $4^{th}$-order harmonic signal IN_4 that each correspond to respective harmonics of the input signal IN. It is to be understood that the harmonic generator 154 is not limited to generating the three demonstrated harmonics, but could instead generate more or less harmonics of the input signal IN.

Each of the harmonic signals IN_2, IN_3, and IN_4 is provided to a harmonic phase shifter 156. The harmonic phase shifter 156 is configured to shift the phases of each of the harmonic signals IN_2, IN_3, and IN_4 relative to the input signal IN. In the example of FIG. 4, the harmonic phase shifter 156 is programmed by phase correction coefficients $\phi$-CORR, such as generated from the controller 82 during a calibration or validation phase as described above. The phase correction coefficients $\phi$-CORR can include a separate set of one or more phase correction coefficients for each of the harmonic signals IN_2, IN_3, and IN_4. Specifically, the harmonic phase shifter 156 includes a set of $2^{nd}$-order harmonic $\phi$ coefficients 158, a set of $3^{rd}$-order harmonic $\phi$ coefficients 160, and a set of $4^{th}$-order harmonic $\phi$ coefficients 162. Therefore, the harmonic phase shifter 156 can shift each of the respective phases of the harmonic signals IN_2, IN_3, and IN_4 independently of each other. As a result, the separate harmonics of the communication signals can each be shifted by an amount of phase-shift corresponding to the respective phase correction coefficients $\phi$-CORR, as determined by the phase at which the maximum peak and minimum trough are identified. In the example of FIG. 4, the phase-shifted output signals are provided from the harmonic phase shifter 156 as signals IN_2$\phi$, IN_3$\phi$, and IN_4$\phi$ corresponding, respectively, to the harmonic signals IN_2, IN_3, and IN_4.

Each of the signals IN_2$\phi$, IN_3$\phi$, and IN_4$\phi$ are provided to a harmonic amplitude adjuster 164. The harmonic amplitude adjuster 164 is configured to modify each of the signals IN_2$\phi$, IN_3$\phi$, and IN_4$\phi$ by a specific amplitude. In the example of FIG. 4, the harmonic amplitude adjuster 164 is programmed by gain correction coefficients g-CORR, such as generated from the controller 82 during a calibration or validation phase as described above. The gain correction coefficients g-CORR can include separate sets of gain correction coefficients for each of the signals IN_2$\phi$, IN_3$\phi$, and IN_4$\phi$. Specifically, the harmonic amplitude adjuster 164 includes a set of $2^{nd}$-order harmonic g coefficients 166, a set of $3^{rd}$-order harmonic g coefficients 168, and a set of $4^{th}$-order harmonic g coefficients 170. Therefore, the harmonic amplitude adjuster 164 can adjust the amplitude each of the signals IN_2$\phi$, IN_3$\phi$, and IN_4$\phi$ independently of each other. As a result, the separate harmonics of the communication signals can each be adjusted by a specific amplitude corresponding to the respective gain correction coefficients g-CORR, as determined by the difference between the maximum peak and minimum trough. In the example of FIG. 4, the adjusted output signals are provided from the harmonic amplitude adjuster 164 as signals IN_2g, IN_3g, and IN_4g corresponding, respectively, to the harmonic signals IN_2, IN_3, and IN_4.

The amplified input signal IN_g and the signals IN_2g, IN_3g, and IN_4g are all provided to a summation component 172. The summation component 172 is configured to combine the amplified input signal IN_g and the signals IN_2g, IN_3g, and IN_4g and to provide an output signal OUT. In the example of FIG. 4, the summation component 172 can provide the output signal OUT as corresponding to one of an I or Q component signal, such that the output signal OUT can correspond to one of the signals OUT_I or OUT_Q in the example of FIG. 2. Based on the operation of the harmonic phase shifter 156 and the harmonic amplitude adjuster 164, the output signal OUT is effectively predistorted by phase and gain, such that the predistortion substantially compensates for the non-linearity of the transmitter 52, such as from the power amplifier 64. Therefore, the output signal OUT is transmitted from the transmitter 52 as a transmit signal TX that has substantial linearization.

It is to be understood that the communication system 50 and the polyharmonic predistortion system 150 are not intended to be limited to the examples of FIGS. 2 and 4, respectively. As described above, the output signal OUT in the example of FIG. 4 can correspond to one of the output signals OUT_I and OUT_Q in the example of FIG. 2. Therefore, the polyharmonic predistortion system 150 demonstrated in the example of FIG. 4 can include a harmonic generator, harmonic phase shifter, harmonic amplitude adjuster, and summation component for each of the I and Q components of the output signal OUT to generate the respective output signals OUT_I and OUT_Q. As another example, the communication system 50 is not limited to being implemented in an OFDM system, but could instead be implemented in any of a variety of communication systems. In addition, the polyharmonic predistortion system 150 can be reconfigured to provide gain prior to phase shifting the harmonic signals, such that the harmonic phase shifter 156 and the harmonic amplitude adjuster 164 can be reversed in the example of FIG. 4. Therefore, linearization of the transmitter 52 can be implemented in any of a variety of ways.

Figure 5:
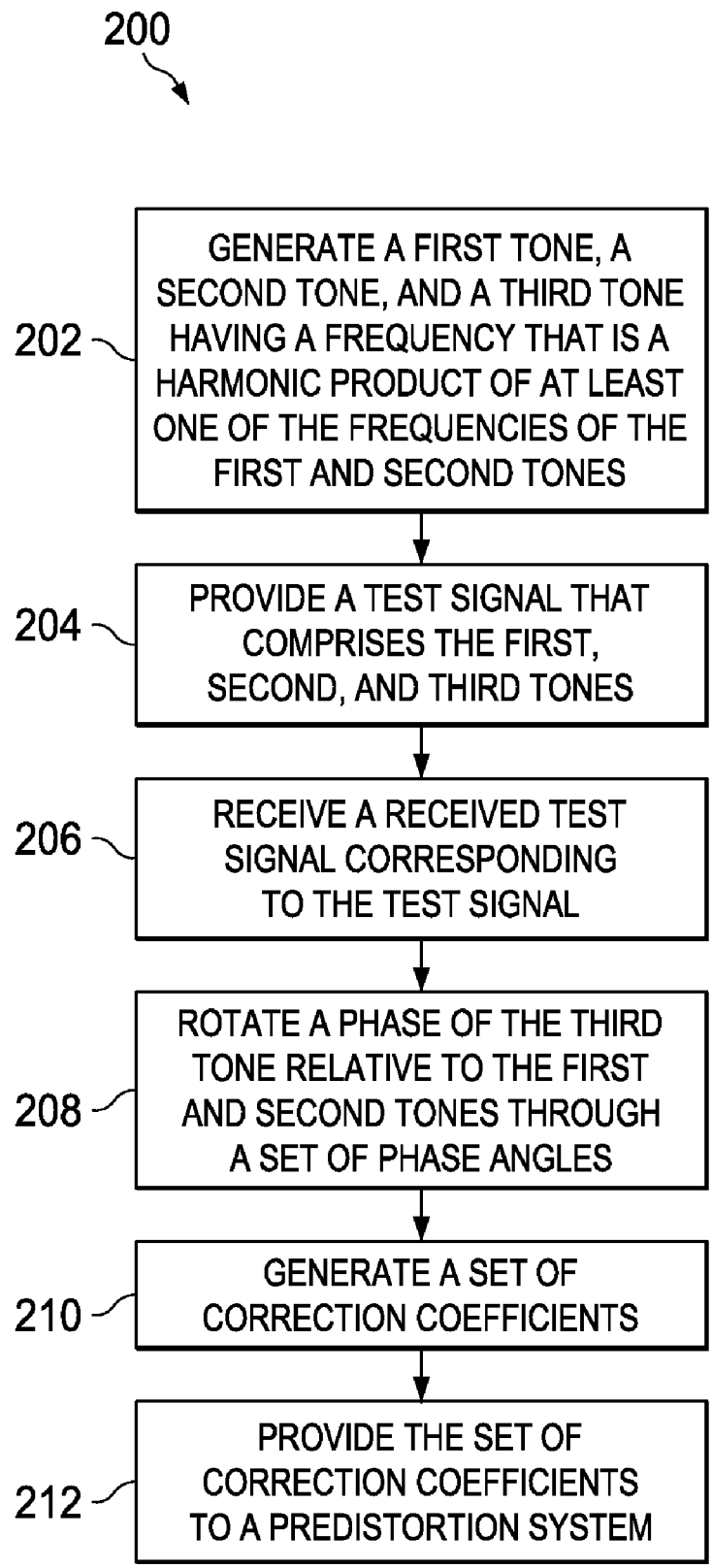
FIG. 5 illustrates an example of a method for substantially linearizing an input signal in accordance with an aspect of the invention.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., analog or digital circuitry, such as may be embodied in an application specific integrated circuit), software (e.g., as executable instructions stored in memory or running on one or more computer systems or a DSP), or any combination of hardware and software.

FIG. 5 illustrates an example of a method 200 for substantially linearizing an input signal in accordance with an aspect of the invention. At 202, a first tone, a second tone, and a third tone having a frequency that is a harmonic product of at least one of the frequencies of the first tone and the second tone are generated. The first tone and the second tone can have substantially arbitrary frequencies. The third tone can have a frequency that is a harmonic product corresponding to a respective one of a plurality of harmonics of communication signals to be transmitted from the transmitter for which correction coefficients are generated.

At 204, a transmit test signal that comprises the first, second, and third tones is provided to the transmitter. The transmit test signal can be subjected to the non-linearity of the transmitter, such as from a non-linear power amplifier. At 206, a received test signal corresponding to the test signal is received on a receiver that is communicatively coupled to the transmitter. The communicative coupling can be wireless, or it can be an internal coupling, such as a leakage path. At 208, a phase of the third tone is rotated relative to the first and second tones through a set of phases. The rotation can be a rotation of any combination of the tones, so long as not all of the tones are rotated the same.

At 210, a set of correction coefficients are generated based on an interaction of the third tone with a non-linear harmonic and/or intermodulation signal component in the received test signal in response to a phase relationship of the third tone relative to the first and second tones. The interaction of the third tone with the non-linear signal component can be a power or voltage summation of the third tone with the non-linear signal component at an approximately equal frequency. The set of correction coefficients can be phase and gain correction coefficients for a respective one of a plurality of harmonics or intermodulation products of the communication signals. At 212, the set of correction coefficients is provided to a predistortion system for substantially linearizing communication signals transmitted from the transmitter. The predistortion system can be a polyharmonic predistortion system, such that a separate set of phase and gain correction coefficients are generated for each of a plurality of harmonics intermodulation distortions of the communication signals, with each of the harmonics being based on a separate harmonic or intermodulation product frequency of the third tone.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A communication system comprising:
a tone generator configured to generate a first tone, a second tone, and a third tone, the third tone having a frequency that is a harmonic product of at least one of the frequencies of the first tone and the second tone, the first tone, the second tone, and the third tone conveyed into an amplifier of a transmitter from the tone generator;
a transmitter configured to transmit a test signal comprising the first, second, and third tones, the transmitter comprising a predistortion system;
a receiver that is communicatively coupled to the transmitter and is configured to receive and process a received test signal corresponding to the test signal; and
a controller configured to generate a set of correction coefficients based on a measured interaction of the third tone with a non-linear signal component in the received test signal, the set of correction coefficients being provided to program the predistortion system of the amplifier for substantially linearizing communication signals transmitted via the transmitter;
wherein the tone generator generates the third tone, the third tone conveyed into the amplifier, at a frequency that is selected as the harmonic product of at least one of the frequencies of the first and second tones, and wherein the controller is configured to generate a set of correction coefficients for a corresponding harmonic of the communications signals transmitted via the transmitter to prelinearize the amplifier;

wherein the tone generator further comprises a phase adjuster that is configured to rotate a phase of the third tone relative to the first and second tones through a range of phases, wherein the controller controls the phase adjuster to rotate the phase of the third tone; and wherein the measured interaction of the third tone with the non-linear signal component varies as a function of a phase relationship of the third tone relative to the first and second tones.

2. The system of claim 1, wherein the controller is configured to generate a corresponding set of correction coefficients for each respective one of a plurality of harmonics of the communication signals via the transmitter, and wherein the tone generator generates the third tone at a frequency that is selected as the harmonic product of at least one of the frequencies of the first and second tones for each respective one of the plurality of harmonics of the communication signals transmitted via the transmitter.

3. The system of claim 1, further comprising an estimator configured to implement a fast Fourier transform to measure amplitude components of the non-linear signal component for the range of phases and to generate the set of receive data corresponding to the range of phases and respective components measured by the estimator.

4. The system of claim 1, wherein the set of correction coefficients comprises phase correction coefficients, the controller generating the phase correction coefficients based on a first phase of the third tone relative to the first and second tones at which the non-linear signal component has a maximum amplitude peak at the frequency of the third tone and a second phase of the third tone relative to the first and second tones at which the non-linear signal component has a minimum amplitude trough at the frequency of the third tone.

5. The system of claim 4, wherein the set of correction coefficients comprises gain correction coefficients, the controller generating the gain correction coefficients based on an amplitude difference between the maximum amplitude peak for the first phase of the third tone and the minimum amplitude trough for the second phase of the third tone of the non-linear signal component.

6. The system of claim 5, wherein the controller is configured to generate the phase correction coefficients and the gain correction coefficients for each of a plurality of harmonics, the predistortion system being configured to apply the phase correction coefficients and the gain correction coefficients to each of the plurality of harmonics of the communication signals transmitted from the transmitter.

7. An integrated circuit comprising at least the transmitter and the receiver of the communication system of claim 1.

8. The apparatus of claim 1, wherein the amplifier of the transmitter is an external amplifier to the transmitter.

9. The apparatus of claim 1, further comprising a quadrature modulator coupled before the amplifier.

10. A communication system comprising:
a transmitter comprising a predistortion system that is configured to predistort communication signals that are transmitted from the transmitter for substantially linearizing the communication signals of an amplifier of the transmitter based on a set of correction coefficients programmed for each of a plurality of harmonics of the communication signals;
a tone generator configured to generate and convey a plurality of test signals to the amplifier of the transmitter including the amplifier, each respective one of the plurality of test signals comprising:
a first tone having a first frequency,
a second tone having a second frequency, and
a third tone having a frequency that is a harmonic product of at least one of the first tone and the second tone corresponding a respective one of the plurality of harmonics of the communication signals;
a receiver that is communicatively coupled to the transmitter to receive the communications signal transmitted by the transmitter and provide a received test signal corresponding to each respective one of the plurality of test signals;
an estimator configured to process each received test signal and provide corresponding receive data; and
a controller configured to generate the set of correction coefficients for each of the plurality of harmonics of the communication signals based on the corresponding receive data the set of correction coefficients being provided to program the predistortion system of the amplifier for substantially linearizing communication signals transmitted via the transmitter;

wherein the tone generator generates the third tone, the third tone introduced into the amplifier, at the frequency that is selected as the harmonic product of at least one of the frequencies of the first and second tones, and wherein the controller is configured to generate a set of correction coefficients for a corresponding harmonic of the communications signals transmitted via the transmitter;

wherein the tone generator further comprises a phase adjuster that is configured to rotate a phase of the third tone relative to the first and second tones through a range of phases, wherein the controller controls the phase adjuster to rotate the phase of the third tone, and wherein the measured interaction of the third tone with the non-linear signal component varies as a function of a phase relationship of the third tone relative to the first and second tones.

11. The system of claim 10, wherein the estimator is further configured to generate a set of phase and amplitude components of a non-linear signal component of each received test signal, and wherein the set of correction coefficients include phase correction coefficients and gain correction coefficients for each of the plurality of harmonics of the communications signals.

12. The system of claim 11, wherein the tone generator further comprises a phase adjuster configured to rotate the third tone relative to the first and second tones through a set of phases, and wherein the controller is configured to generate the set of correction coefficients based on an interaction of the third tone with the non-linear signal component of each received test signal at each phase through which the third tone is rotated.

13. The system of claim 12, wherein the set of correction coefficients further comprise:
phase correction coefficients for each of the plurality of harmonics based on at least one of a first phase of the third tone at which the non-linear signal component in the received test signal has a maximum amplitude at the frequency of the third tone and a second phase of the third tone at which the non-linear signal component of the received test signal has a minimum amplitude at the frequency of the third tone, and
amplitude correction coefficients for each of the plurality of harmonics based on an amplitude difference between an amplitude peak for the first phase of the third tone and an amplitude trough for the second phase of the third tone.

14. The system of claim 10, further comprising a quadrature modulator coupled before the amplifier.

15. A method for substantially linearizing an amplifier of a transmitter of a communication system, the method comprising: generating a first tone, a second tone, and a third tone, the third tone having a frequency that is a harmonic product of at least one of the frequencies of the first tone and the second tone; providing and conveying a transmit test signal that comprises the first, second, and third tones to the amplifier, transmitting an amplified first tone, an amplified second tone, and an amplified third tone via the transmitter to generate a transmit test signal; receiving a received test signal corresponding to the transmit test signal on a receiver that is communicatively coupled to the transmitter, the received test signal comprising non-linear signal components introduced by the amplifier of the transmitter; rotating a phase of the third tone relative to the first and second tones through a range of phases; measuring an interaction of the third tone with a non-linear signal component in the received test signal for each phase of the third tone in the range of phases; and generating a set of correction coefficients based on the measured interaction through the range of phases of the third tone relative to the first and second tones. providing the set of correction coefficients to a predistortion system for substantially linearizing communication signals within the amplifier transmitted from the transmitter wherein generating the set of correction coefficients comprises generating a set of correction coefficients for each of a plurality of harmonics of the communication signals via the transmitter, and wherein generating the first, second, and third tones comprises generating the third tone at a frequency that is selected as the harmonic product of at least one of the frequencies of the first and second tones corresponding to the respective one of the plurality of harmonics of the communication signals transmitted via the transmitter; and wherein the measured interaction of the third tone with the non-linear signal component varies as a function of a phase relationship of the third tone relative to the first and second tones.

16. The method of claim 15, wherein generating the set of correction coefficients comprises generating a set of correction coefficients for each of a plurality of harmonics of the communication signals via the transmitter, and wherein generating the first, second, and third tones comprises generating the third tone at a frequency that is selected as the harmonic product of at least one of the frequencies of the first and second tones corresponding to the respective one of the plurality of harmonics of the communication signals transmitted via the transmitter.

17. The method of claim 15, further comprising:
determining a first phase of the third tone relative to the first and second tones at which the non-linear signal component has a maximum amplitude peak at the frequency of the third tone and a second phase of the third tone relative to the first and second tones at which the non-linear signal component has a minimum amplitude trough at the frequency of the third tone; and
generating phase correction coefficients corresponding to the first phase and the second phase.

18. The method of claim 17, further comprising:
determining an amplitude difference between the maximum amplitude peak and the minimum amplitude trough of the non-linear signal component; and
generating gain correction coefficients corresponding to the amplitude difference.

19. The method of claim 15, further comprising:
estimating amplitude and phase components of the non-linear signal component for each phase in the range of phases; and
generating a set of receive data corresponding to the non-linear signal component of the received test signal at each phase in the range of phases based on the estimated amplitude and phase components;
wherein generating the set of correction coefficients further comprises generating the set of correction components based on the set of receive data.

20. The method of claim 15, further comprising a quadrature modulator coupled before the amplifier.

* * * * *